United States Patent
Abdelghaffar et al.

(10) Patent No.: US 12,476,760 B2
(45) Date of Patent: Nov. 18, 2025

(54) FLEXIBLE CROSS-CARRIER APERIODIC SOUNDING REFERENCE SIGNAL TRIGGERING ENHANCEMENT

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 17/916,771

(22) PCT Filed: Apr. 21, 2021

(86) PCT No.: PCT/US2021/028395
§ 371 (c)(1),
(2) Date: Oct. 3, 2022

(87) PCT Pub. No.: WO2021/216706
PCT Pub. Date: Oct. 28, 2021

(65) Prior Publication Data
US 2023/0155776 A1 May 18, 2023

(30) Foreign Application Priority Data

Apr. 21, 2020 (GR) .............................. 20200100201

(51) Int. Cl.
*H04L 5/00* (2006.01)
*H04W 72/0446* (2023.01)
(Continued)

(52) U.S. Cl.
CPC ....... *H04L 5/0051* (2013.01); *H04W 72/0446* (2013.01); *H04W 72/0453* (2013.01); *H04W 72/23* (2023.01)

(58) Field of Classification Search
CPC ..... H04L 5/0051; H04L 5/001; H04L 5/0053; H04W 72/23; H04W 72/0446; H04W 72/0453
See application file for complete search history.

(56) References Cited

U.S. PATENT DOCUMENTS 8,848,520 B2 9/2014 Chen et al.
10,716,125 B2 7/2020 Rico Alvarino et al.
(Continued)

FOREIGN PATENT DOCUMENTS

CN 102742194 A 10/2012
CN 103155506 A 6/2013
(Continued)

OTHER PUBLICATIONS

CMCC: "Remaining Issues for Supporting Unaligned Frame Boundary with Slot Alignment and Partial SFN Alignment for R16 NR Inter-Band CA," 3GPP Draft, 3GPP TSG RAN WG1 #99, R1-1912550, 3rd Generation Partnership Project (3GPP), Mobile Competence Centre, 650, Route Des Lucioles, F-06921, Sophia-Antipolis Cedex, France, vol. RAN WG1. No. Reno, USA; Nov. 18, 2019-Nov. 22, 2019, Nov. 9, 2019 (Nov. 9, 2019), XP051823484, pp. 1-9, Section 3.

(Continued)

*Primary Examiner* — Ian N Moore
*Assistant Examiner* — Latresa A Mccallum
(74) *Attorney, Agent, or Firm* — Patterson + Sheridan, L.L.P.

(57) ABSTRACT

Certain aspects of the present disclosure provide techniques for triggering aperiodic sounding reference signal (A-SRS) transmission across multiple uplink component carriers.

26 Claims, 18 Drawing Sheets

Codebook Based UL

(51) Int. Cl.
*H04W 72/0453* (2023.01)
*H04W 72/23* (2023.01)

(56) References Cited

U.S. PATENT DOCUMENTS

| | | | |
|---|---|---|---|
| 2012/0113869 A1 | 5/2012 | Gaal et al. | |
| 2013/0156014 A1 | 6/2013 | Kim et al. | |
| 2013/0294400 A1* | 11/2013 | Liu | H04L 5/0082 370/330 |
| 2014/0328273 A1* | 11/2014 | Noh | H04L 5/0048 370/329 |
| 2017/0105201 A1* | 4/2017 | Nishio | H04L 5/0048 |
| 2018/0167920 A1* | 6/2018 | Kim | H04L 1/0038 |
| 2019/0149380 A1* | 5/2019 | Babaei | H04W 72/23 370/330 |
| 2019/0281588 A1 | 9/2019 | Zhang et al. | |
| 2020/0322187 A1* | 10/2020 | He | H04L 5/0055 |
| 2021/0037555 A1* | 2/2021 | Papasakellariou | H04L 1/0026 |

FOREIGN PATENT DOCUMENTS

| | | |
|---|---|---|
| JP | 2016086439 A | 5/2016 |
| KR | 20120008473 A | 1/2012 |
| WO | 2011100466 | 8/2011 |
| WO | 2012022368 A1 | 2/2012 |
| WO | 2017173216 | 10/2017 |
| WO | 2019032855 A1 | 2/2019 |

OTHER PUBLICATIONS

International Search Report and Written Opinion—PCT/US2021/028395—ISA/EPO—Jul. 6, 2021.

Oppo: "Discussion on Tx Switching Between Two Uplink Carriers," 3GPP Draft, 3GPP TSG RAN WG1 #100bis, R1-2001743, 3rd Generation Partnership Project (3GPP), Mobile Competence Centre, 650, Route Des Lucioles, F-06921, Sophia-Antipolis Cedex, France, vol. RAN WG1 No. e-Meeting; Apr. 20, 2020-Apr. 30, 2020, Apr. 10, 2020 (Apr. 10, 2020), XP051873317, 4 pages, sec.2.3.2, sec.2.3.1, sec.2.2.

Oppo: "PDCCH Enhancement for URLLC," 3GPP Draft, 3GPP TSG RAN WG1 #100bis, R1-2001773, 3rd Generation Partnership Project (3GPP), Mobile Competence Centre, 650, Route Des Lucioles, F-06921, Sophia-Antipolis Cedex, France, vol. RAN WG1. No. E-Meeting, Apr. 20, 2020-Apr. 30, 2020, Apr. 11, 2020 (Apr. 11, 2020), XP051875262, 14 pages, the whole document.

Oppo: "Discussion on Tx Switching Between Two Uplink Carriers", 3GPP TSG RAN WG1 #100bis, R1-2001743, e-Meeting, Apr. 20, 2020-Apr. 30, 2020, Apr. 10, 2020, 4 Pages.

* cited by examiner

| Value of SRS request field | Triggered aperiodic SRS resource set(s) for DCI format 0_1, 1_1_0 and 2_3 (w/ srs-TPC-PDCCH-Group = 'typeB') | Triggered aperiodic SRS resource set(s) for DCI format 2_3 (w/ srs-TPC-PDCCH-Group = 'typeA') |
|---|---|---|
| 00 | No aperiodic SRS resource set triggered | No aperiodic SRS resource set triggered |
| 01 | SRS resource set(s) configured with higher layer parameter *aperiodicSRS-ResourceTrigger* set to 1 | SRS resource set(s) configured with higher layer parameter *SRS-SetUse* set to 'antenna switching' and *resource Type* set to 'aperiodic' for a 1st set of serving cells |
| 10 | SRS resource set(s) configured with higher layer parameter *aperiodicSRS-ResourceTrigger* set to 2 | SRS resource set(s) configured with higher layer parameter *SRS-SetUse* set to 'antenna switching' and *resource Type* set to 'aperiodic' for a 2nd set of serving cells |
| 11 | SRS resource set(s) configured with higher layer parameter *aperiodicSRS-ResourceTrigger* set to 3 | SRS resource set(s) configured with higher layer parameter *SRS-SetUse* set to 'antenna switching' and *resource Type* set to 'aperiodic' for a 3rd set of serving cells |

```
SRS-Resource ::=                    SEQUENCE {
    srs-ResourceID                      SRS-ResourceID,
    nrofSRS-Ports                       ENUMERATED {port1, ports2, ports4},
    ptrs-PortIndex                      ENUMERATED {n0, n1 }
    transmissionComb                    CHOICE {
        n2                                  SEQUENCE {
            combOffset-n2                       INTEGER (0..1),
            cyclicShift-n2                      INTEGER (0..7)
        },
        n4
            combOffset-n4                       INTEGER (0..3),
            cyclicShift-n4                      INTEGER (0..11)
        }
    }
    resourceMapping                     SEQUENCE {
        startPosition                       INTEGER (0..5),
        nrofSymbols                         ENUMERATED {n1, n2, n4},
        repetitionFactor                    ENUMERATED {n1, n2, n4}
    },
```

FIG. 8B

| Available DCI fields & Scheduling Information in DCI format 0_1 | | Number of bits |
|---|---|---|
| Identifier | DCI format identifier | 1 bit |
| Resource Information | Carrier indicator | 0 or 3bit |
| | UL/SUL indicator | 0 or 1bit |
| | BWP indicator | 0-2bit |
| | Frequency domain resource assignment | variable |
| | Timedomain allocation | 0-4bit |
| | Frequency hopping flag | 0 or 1 bit |
| | UL-SCH Indicator | 1 bit |
| Transport-block related | MCS | 5 bit |
| | New data indicator (NDI) | 1 bit |
| | Redundancy version (RV) | 2 bit |
| HybridAQR related | HARQ Process number | 4 bit |
| | Downlink assignment index | (1 or 2, 0 or 2,4 bit) |
| | CBG transmission information (CBGTI) | 0,2,4,6 bit |
| Multi- antenna related | DM-RS sequence initialization | 0 or 1 bit |
| | Antenna ports | 2-5 bit |
| | SRS request | 2 bit |
| | CSI request | 0-6bit |
| | SRS resource indicator (SRI) | Variable |
| | PTRS DMRS association | 0-2bit |
| | Precoding information and number of layers | 0-6bit |
| Power Control | TPC command for scheduled PUSCH | 2 bit |
| | Beta offset | 0- 2bit |

FIG. 11

FLEXIBLE CROSS-CARRIER APERIODIC SOUNDING REFERENCE SIGNAL TRIGGERING ENHANCEMENT

CROSS-REFERENCE TO RELATED APPLICATION(S)

This application is a national stage application under 35 U.S.C. 371 of PCT/US2021/028395 filed Apr. 21, 2021, which claims the benefit of Greek patent application Ser. No. 20200100201, filed on Apr. 21, 2020, which are incorporated herein by reference in their entireties as if fully set forth below and for all applicable purposes.

BACKGROUND

Field of the Disclosure

Aspects of the present disclosure relate to wireless communications, and more particularly, to techniques for triggering aperiodic sounding reference signal (A-SRS) transmission across different uplink carriers.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes receiving a sounding reference signals (SRS) configuration indicating a plurality of SRS resource sets, receiving signaling triggering aperiodic SRS (A-SRS) of at least one SRS resource set on at least two different uplink component carriers (CCs), and transmitting aperiodic SRS (A-SRS) of the SRS resource sets on the different uplink CCs, wherein at least one of the uplink CCs is configured for at least one of physical uplink shared channel (PUSCH) or physical uplink control channel (PUCCH) transmission.

Certain aspects of the disclosure relate to a method for wireless communication by a network entity. The method generally includes sending, to a user equipment (UE), a sounding reference signals (SRS) configuration indicating a plurality of SRS resource sets; sending the UE signaling triggering aperiodic SRS (A-SRS) of at least one SRS resource set on at least two different uplink component carriers (CCs); and monitoring for aperiodic SRS (A-SRS) of the SRS resource sets transmitted on the different uplink CCs, wherein at least one of the uplink CCs is configured for at least one of physical uplink shared channel (PUSCH) or physical uplink control channel (PUCCH) transmission.

Aspects of the present disclosure also include various apparatuses, means, and computer readable mediums with instructions for performing the various operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 8A-8B illustrate example SRS triggering and SRS parameters.

FIG. 11 is a table illustrating an example DCI format with bits that can be repurposed to trigger cross-carrier A-SRS, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
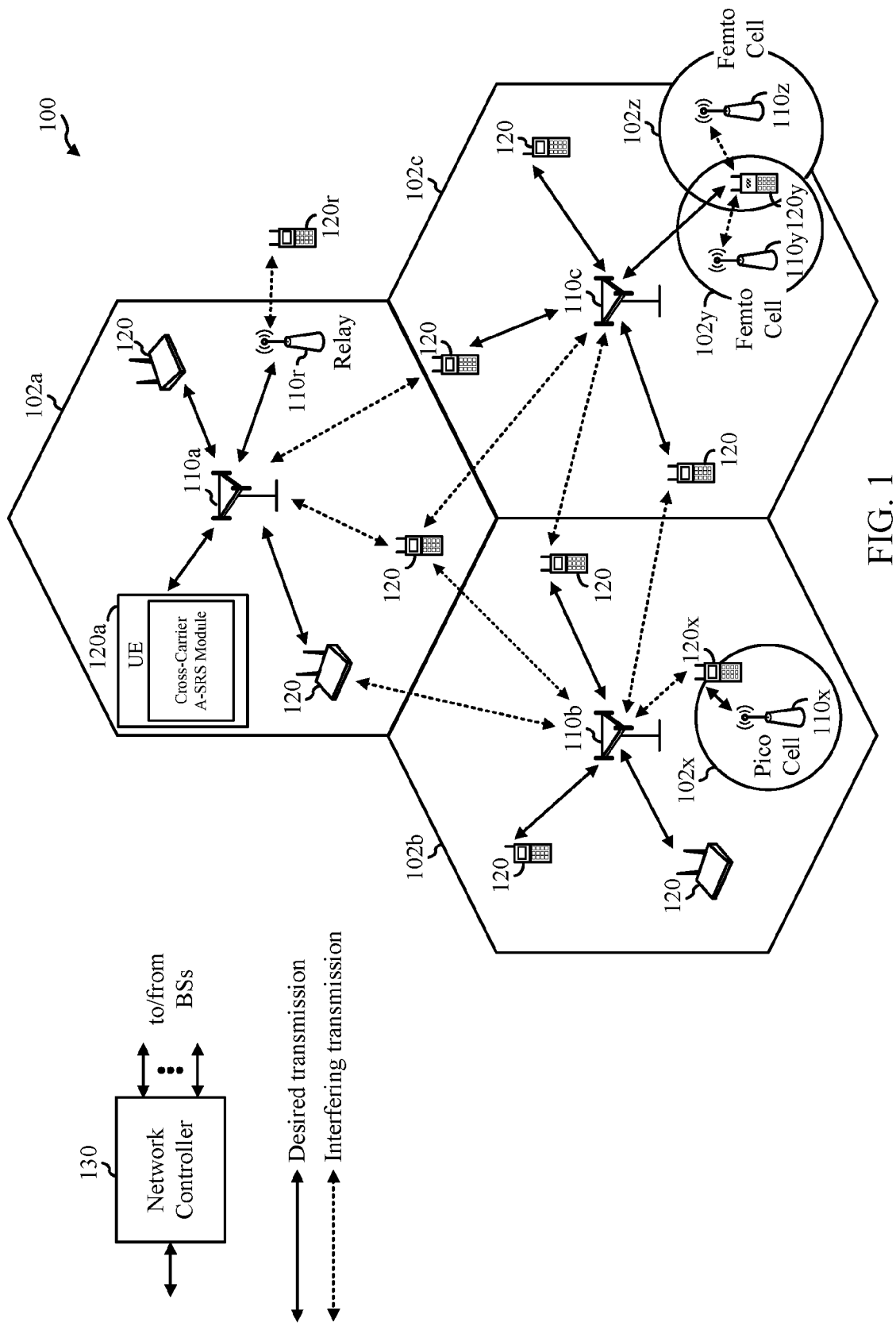
FIG. 1 is a block diagram conceptually illustrating an example telecommunications system, in accordance with certain aspects of the present disclosure.

Aspects of the present disclosure relate to wireless communications, and more particularly, to techniques for triggering cross-carrier aperiodic SRS transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 in the wireless communication network 100 may include a cross-carrier A-SRS module configured to perform (or assist the UE 120 in performing) operations 900 described below with reference to FIG. 9. Similarly, a base station 120 (e.g., a gNB) may be configured to perform operations 1000 of FIG. 10 to trigger A-SRS transmissions (from a UE performing operations 900 of FIG. 9).

As illustrated in FIG. 1, the wireless communication network 100 may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
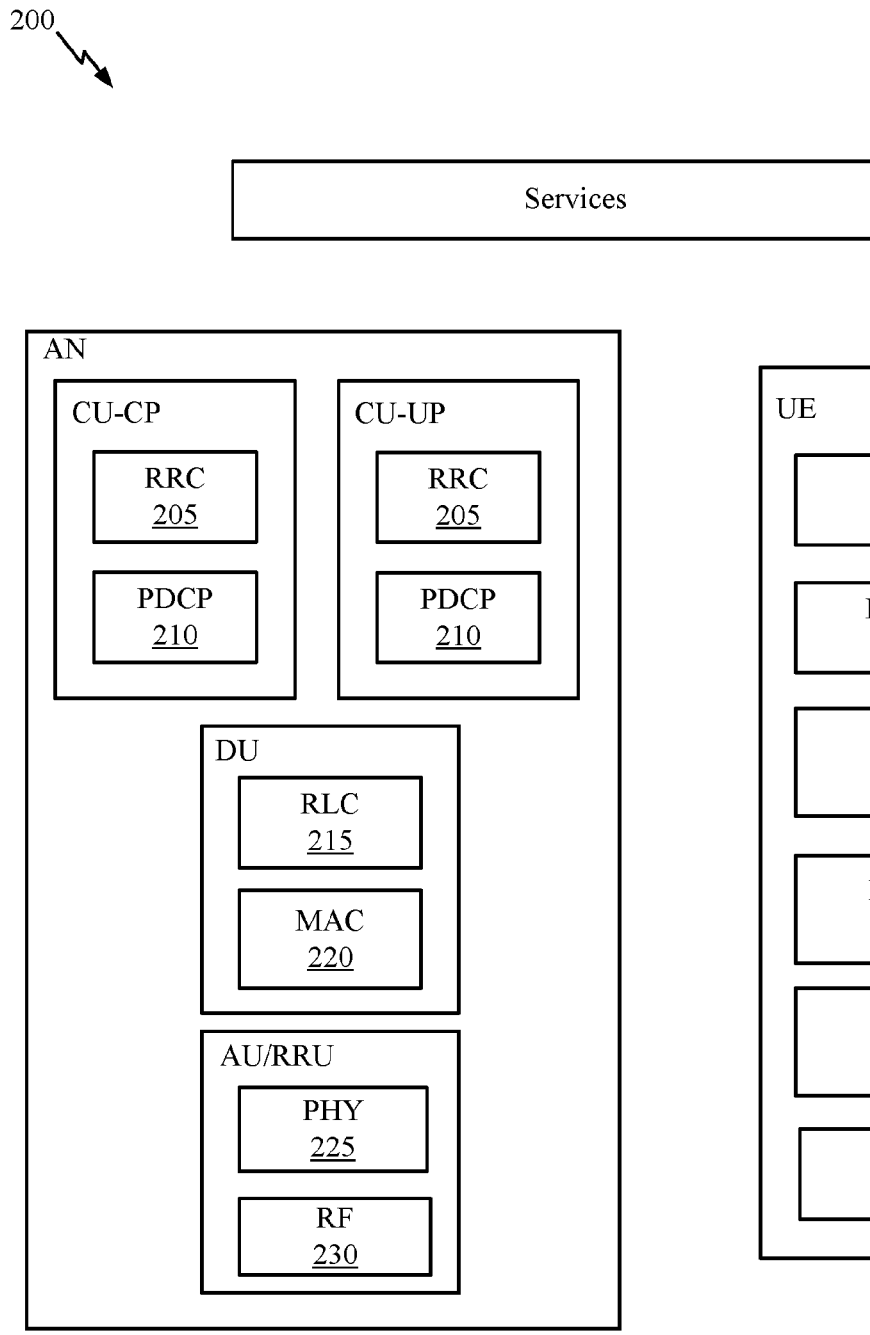
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the AN (e.g., BS 110 in FIG. 1). The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
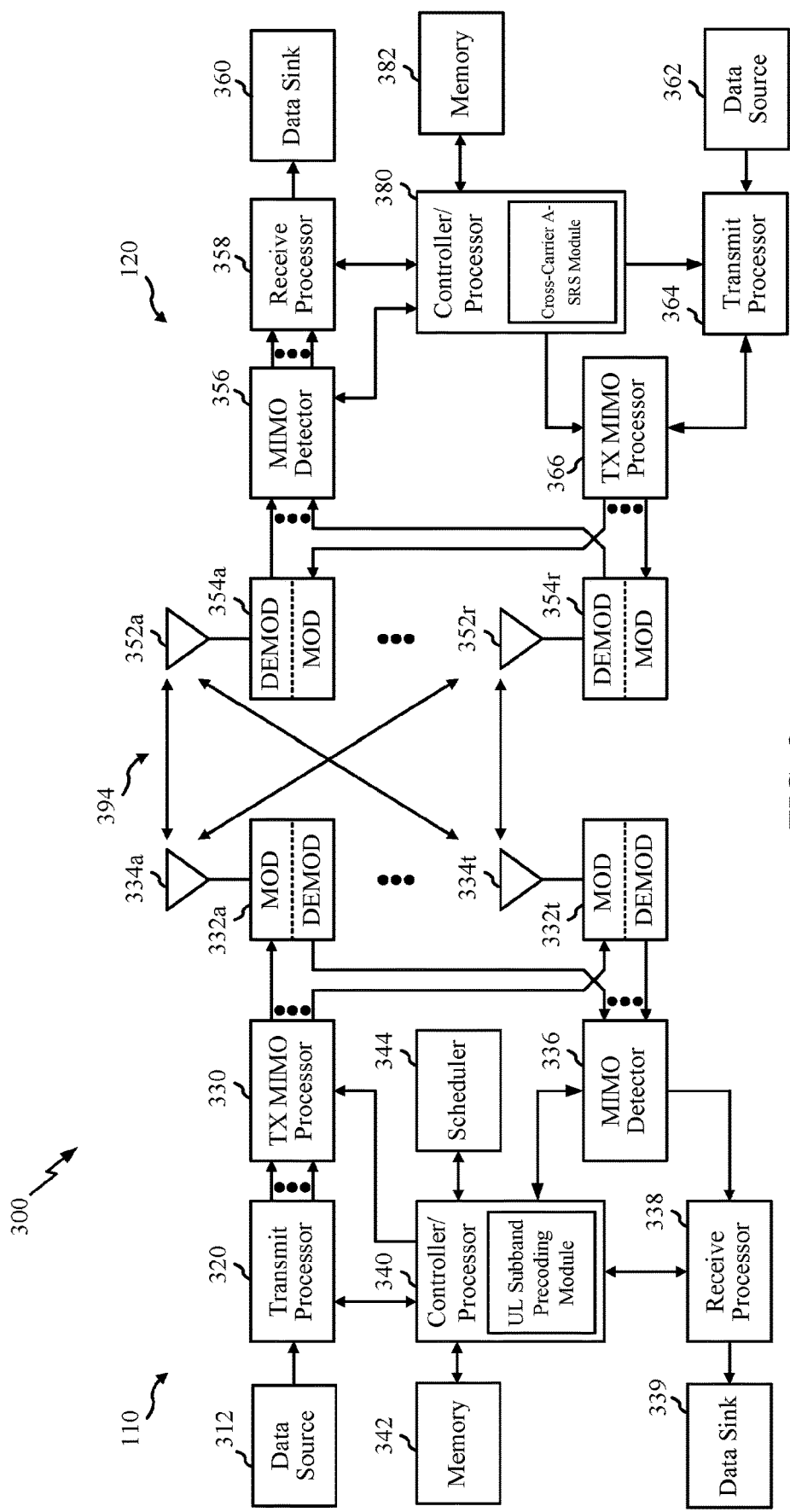
FIG. 3 is a block diagram conceptually illustrating a design of an example base station (BS) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 may be configured (or used) to perform operations 900 of FIG. 9 and/or antennas 334, processors 320, 330, 338, and/or controller/processor 340 of the BS 110 may be configured (or used) to perform operations 1000 described below with reference to FIG. 10.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 120) includes multiple transmit antennas 354a through 354r, and a receiver (e.g., UE 110) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 110, a BS 120, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH)) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Figure 4:
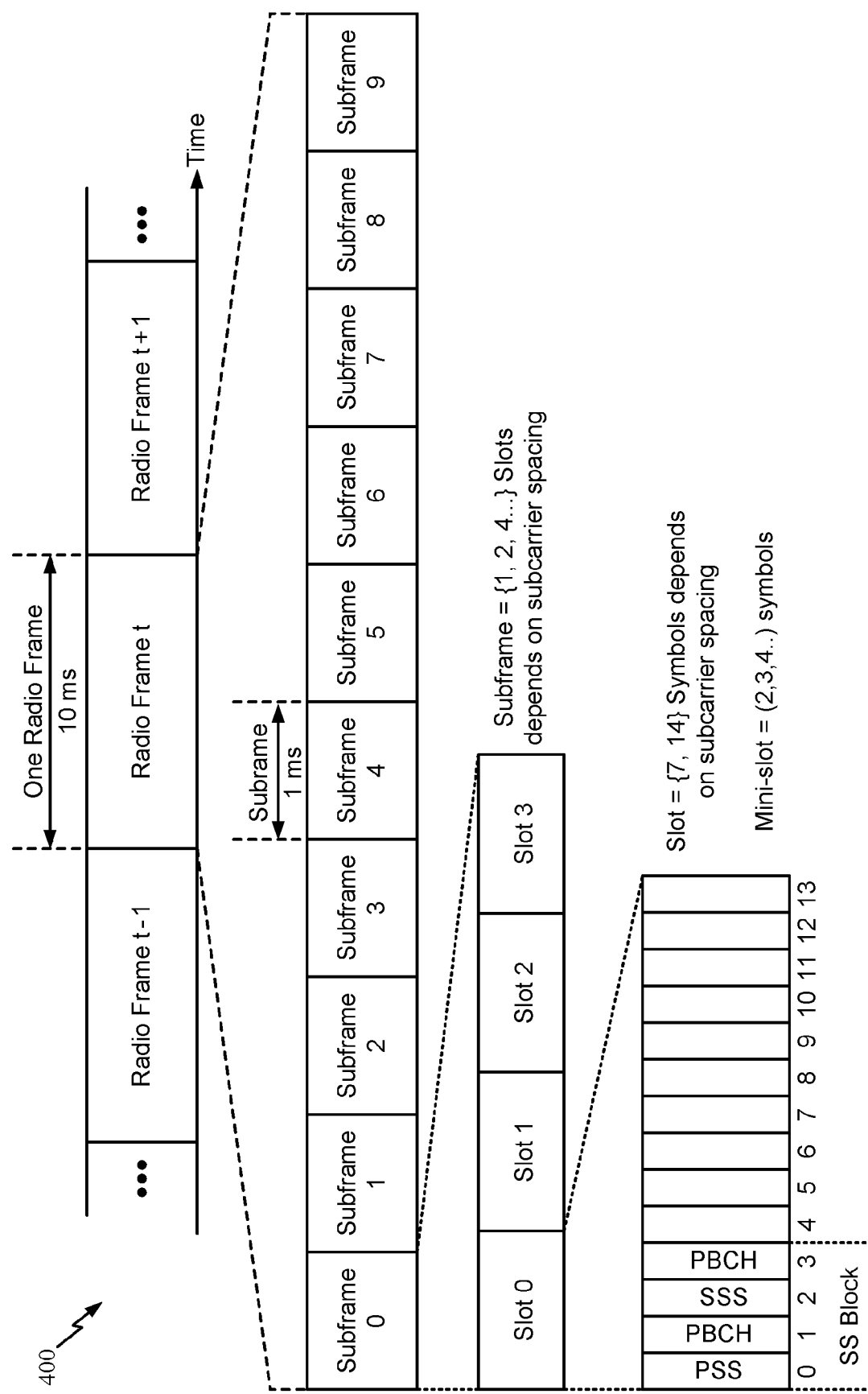
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SRS Based Transmissions

Some deployments (e.g., NR Release 15 and 16 systems) support codebook-based transmission and non-codebook-based transmission schemes for uplink transmissions with wideband precoders. Codebook-based UL transmission is based on BS configuration and can be used in cases where reciprocity may not hold.

Figure 5:
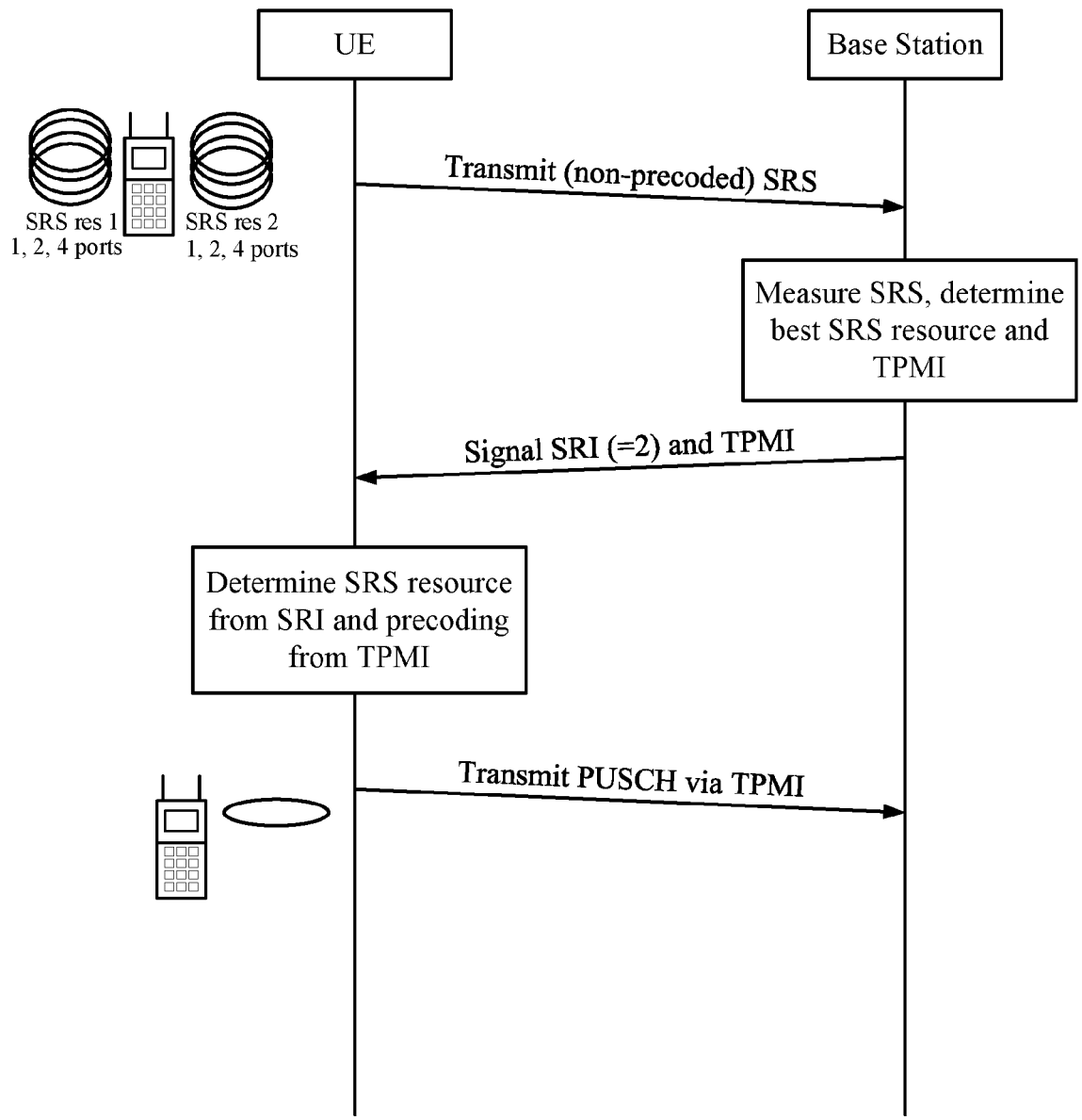
FIG. 5 is a call flow diagram illustrating an example of codebook based UL transmission, in accordance with certain aspects of the present disclosure.

FIG. 5 is a call flow diagram illustrating an example of conventional codebook based UL transmission using a wideband precoder. As illustrated, a UE transmits (non-precoded) SRS with up to 2 SRS resources (with each resource having 1, 2 or 4 ports). The gNB measures the SRS and, based on the measurement, selects one SRS resource and a wideband precoder to be applied to the SRS ports within the selected resource.

As illustrated, the gNB configures the UE with the selected SRS resource via an SRS resource indictor (SRI) and with the wideband precoder via a transmit precoder matrix indicator (TPMI). For a dynamic grant, the SRI and TPMI may be configured via DCI format 0_1. For a configured grant (e.g., for semi-persistent uplink), SRI and TPMI may be configured via RRC or DCI.

The UE determines the selected SRS resource from the SRI and precoding from TPMI and transmits PUSCH accordingly.

Figure 6:
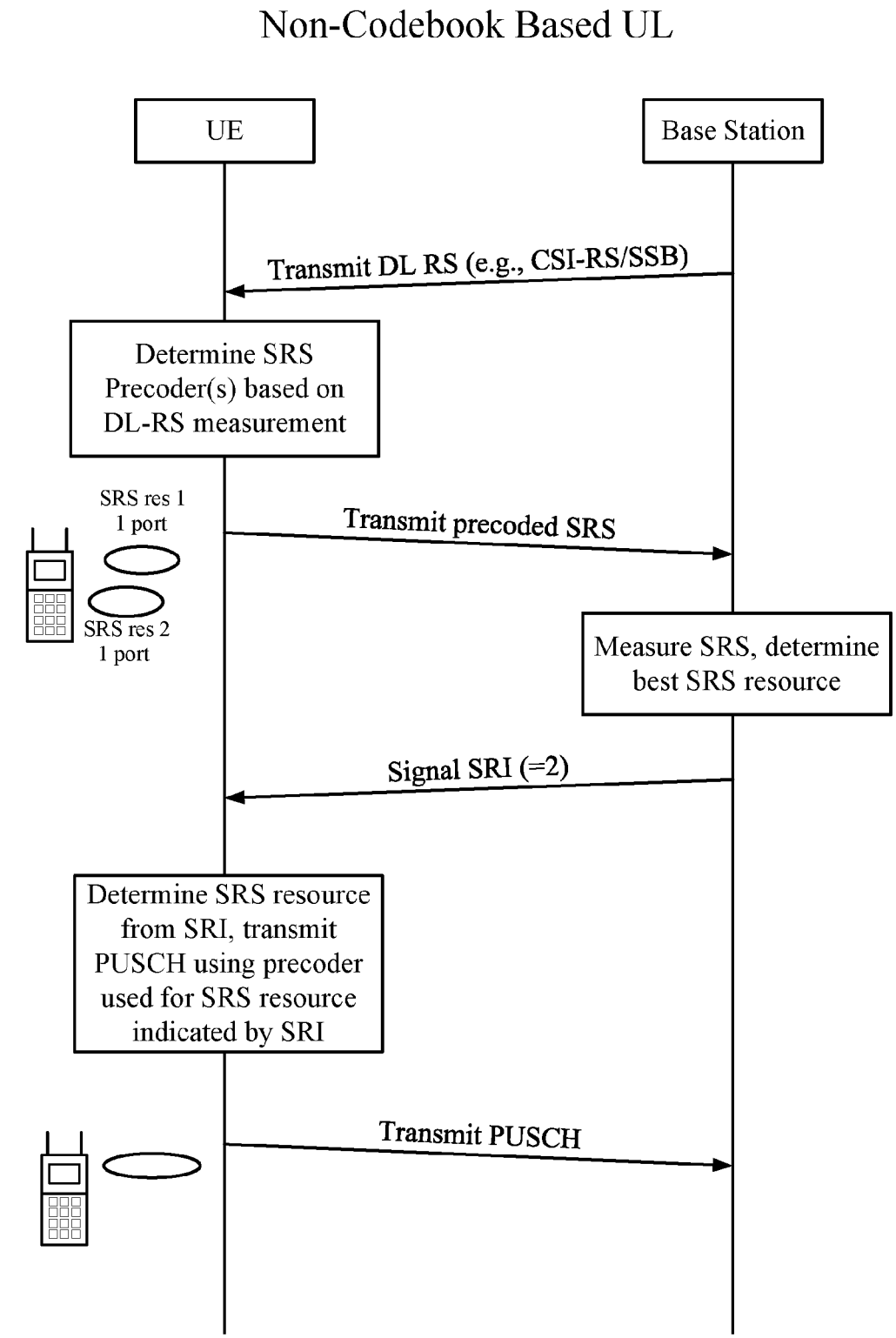
FIG. 6 is a call flow diagram illustrating an example of non-codebook based UL transmission, in accordance with certain aspects of the present disclosure.

FIG. 6 is a call flow diagram illustrating an example of non-codebook based UL transmission. As illustrated, a UE transmits (precoded) SRS. While the example shows 2 SRS resources, the UE may transmit with up to 4 SRS resources (with each resource having 1 port). The gNB measures the SRS and, based on the measurement, selects one or more SRS resource. In this case, since the UE sent the SRS precoded, by selecting the SRS resource, the gNB is effectively also selecting precoding. For non-codebook based UL transmission, each SRS resource corresponds to a layer. The precoder of the layer is actually the precoder of the SRS which is emulated by the UE. Selecting N SRS resources means the rank is N. The UE is to transmit PUSCH using the same precoder as the SRS.

As illustrated, the gNB configures the UE with the selected SRS resource via an SRS resource indictor (SRI). For a dynamic grant, the SRI may be configured via DCI format 0_1. For a configured grant, the SRI may be configured via RRC or DCI.

Example Flexible Cross-Carrier Aperiodic Sounding Reference Signal Triggering Enhancement In conventional systems, the network is unable to trigger SRS without scheduling downlink or uplink (DL/UL) data. Aspects of the present disclosure, however, provide techniques that may be used to trigger aperiodic SRS (A-SRS) without scheduling DL/UL data. As will be described in greater detail below, by using downlink control information (DCI) without scheduling data, bits of certain fields in the DCI (conventionally used for scheduling) may be repurposed to enable triggering multiple AP-SRS resource sets jointly on different UL carriers which have PUSCH/PUCCH configured (UL CA). The DCI can be a group common DCI or UE-specific DCI. The UE-specific DCI can be a DCI that schedules DL Data also (DL grant), or UL data (UL grant), or a DCI that is only used to trigger SRS or SRS plus TPC commands or, SRS plus CSI-RS for that specific UE.

Figure 7:
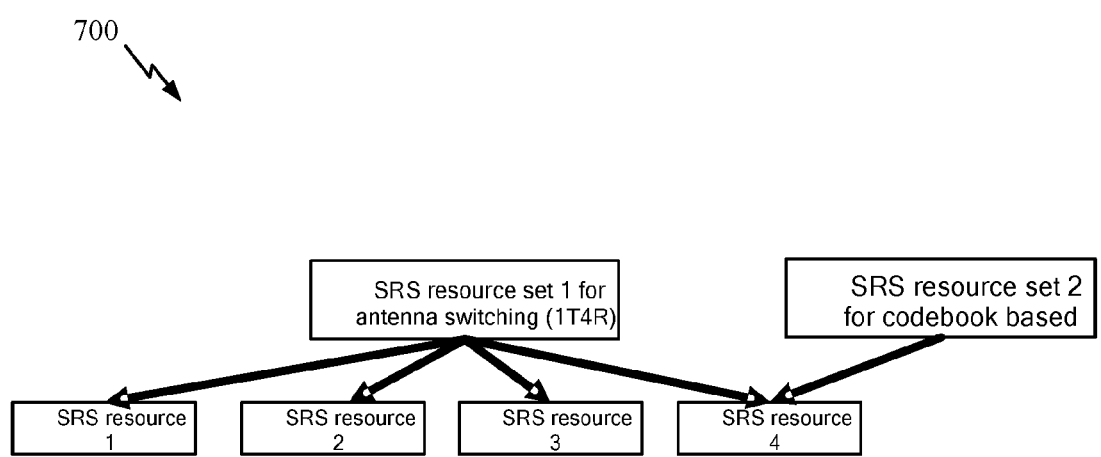
FIG. 7 is a block diagram illustrating an example SRS configuration of SRS resource sets.

A UE may be configured with one or more SRS resource sets, as illustrated in FIG. 7. An SRS resource set contains a sets of SRS resources transmitted by one UE. An SRS resource set may be transmitted aperiodically (DCI-signaled), semi-persistently, or periodically. A UE may be configured with multiple resources, which may be grouped in a SRS resource set depending on its use case (e.g., antenna switching, codebook-based, non-codebook based, beam management).

As illustrated in FIG. 8A, A-SRS transmission, 2 bits in the DL or UL DCI can be used to trigger the transmission of an SRS resource set. Each A-SRS resource set is tagged with either 1, or 2, or 3, corresponding to code point 01,10,11, while DCI code point 00 indicates no A-SRS transmission.

Each AP SRS resource set is configured in RRC with a "slotOffset" from 0 . . . 32, which generally refers to an offset in number of slots between the triggering DCI and the actual transmission of this SRS-ResourceSet. If this field is absent, the UE applies no offset (value 0). Once the SRS resource set is selected by DCI, the slot offset is fixed.

As illustrated in FIG. 8B, each SRS resource of a set has an associated symbol index of the first symbol containing the SRS resource ("startPosition"). An SRS resource could span multiple consecutive OFDM symbols.

As noted above, A-SRS can be either triggered with DCI format 1_1 or DCI format 0_1 with UL-SCH=1 or with UL-SCH=0 and with non-zero CSI request. Conventionally, as noted above, the network is unable to trigger SRS without scheduling DL/UL data and without CSI request due to the following restriction in current specification, which limits the flexibility of A-SRS triggering.

Aspects of the present disclosure, however, provide techniques that may be used to trigger aperiodic SRS (A-SRS) without scheduling DL/UL data and repurposing bits of certain fields in the DCI (conventionally used for scheduling) for triggering multiple AP-SRS resource sets jointly on different UL carriers.

Figure 9:
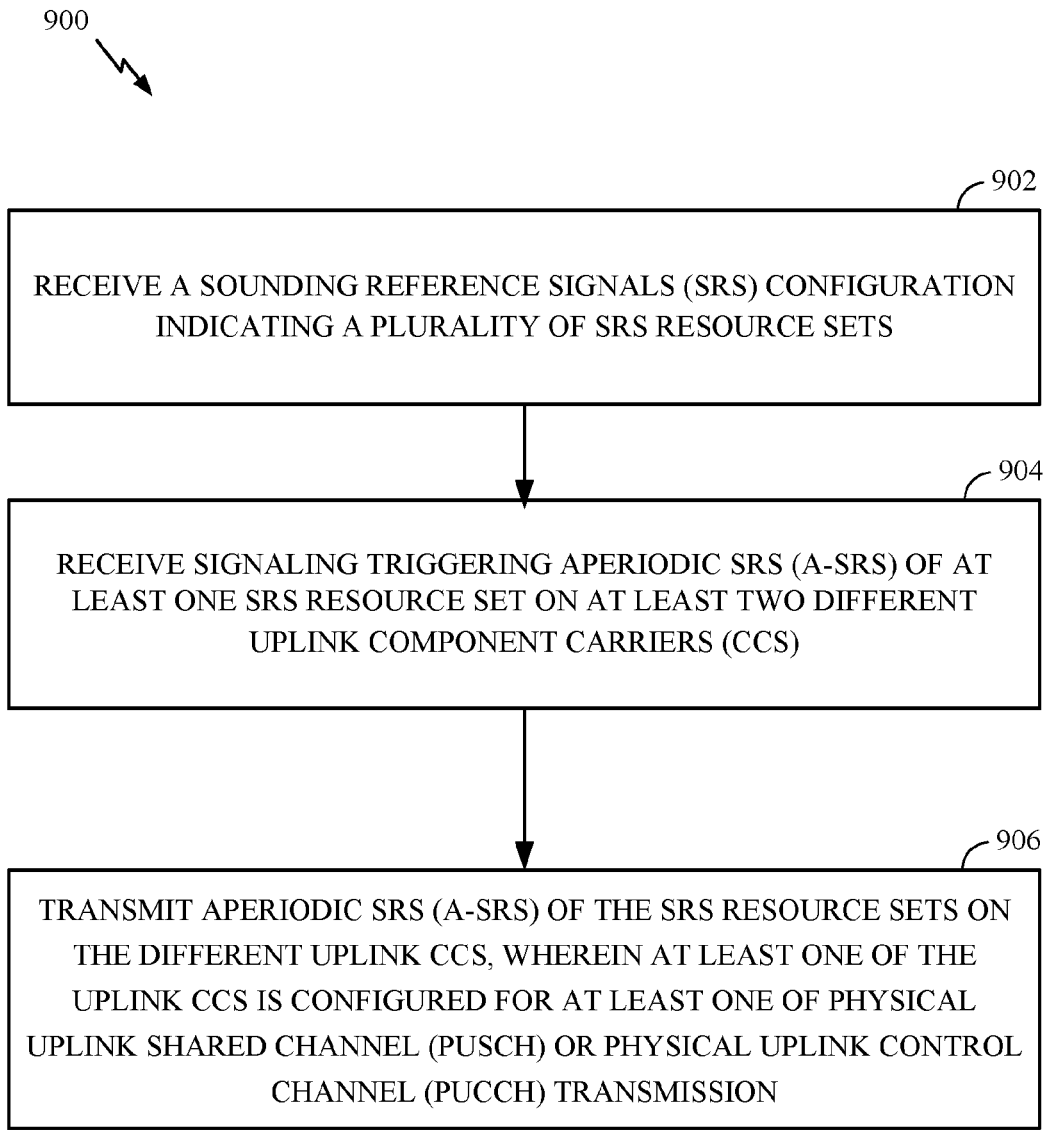
FIG. 9 illustrates example operations for wireless communications by a UE, in accordance with certain aspects of the present disclosure.

FIG. 9 illustrates example operations 900 for wireless communication by a UE, in accordance with certain aspects of the present disclosure. Operations 900 may be performed, for example, by a UE 120 of FIG. 1 or FIG. 3 for flexible cross-carrier aperiodic sounding reference signal triggering.

Operations 900 begin, at 902, by receiving a sounding reference signals (SRS) configuration indicating a plurality of SRS resource sets. At 904, the UE receives signaling triggering aperiodic SRS (A-SRS) of at least one SRS resource set on at least two different uplink component carriers (CCs). For example, the signaling may be a certain format of DCI with certain bits repurposed to trigger A-SRS on a plurality of SRS resource sets At 906, the UE transmits aperiodic SRS (A-SRS) of the SRS resource sets on the different uplink CCs, wherein at least one of the uplink CCs is configured for at least one of physical uplink shared channel (PUSCH) or physical uplink control channel (PUCCH) transmission.

Figure 10:
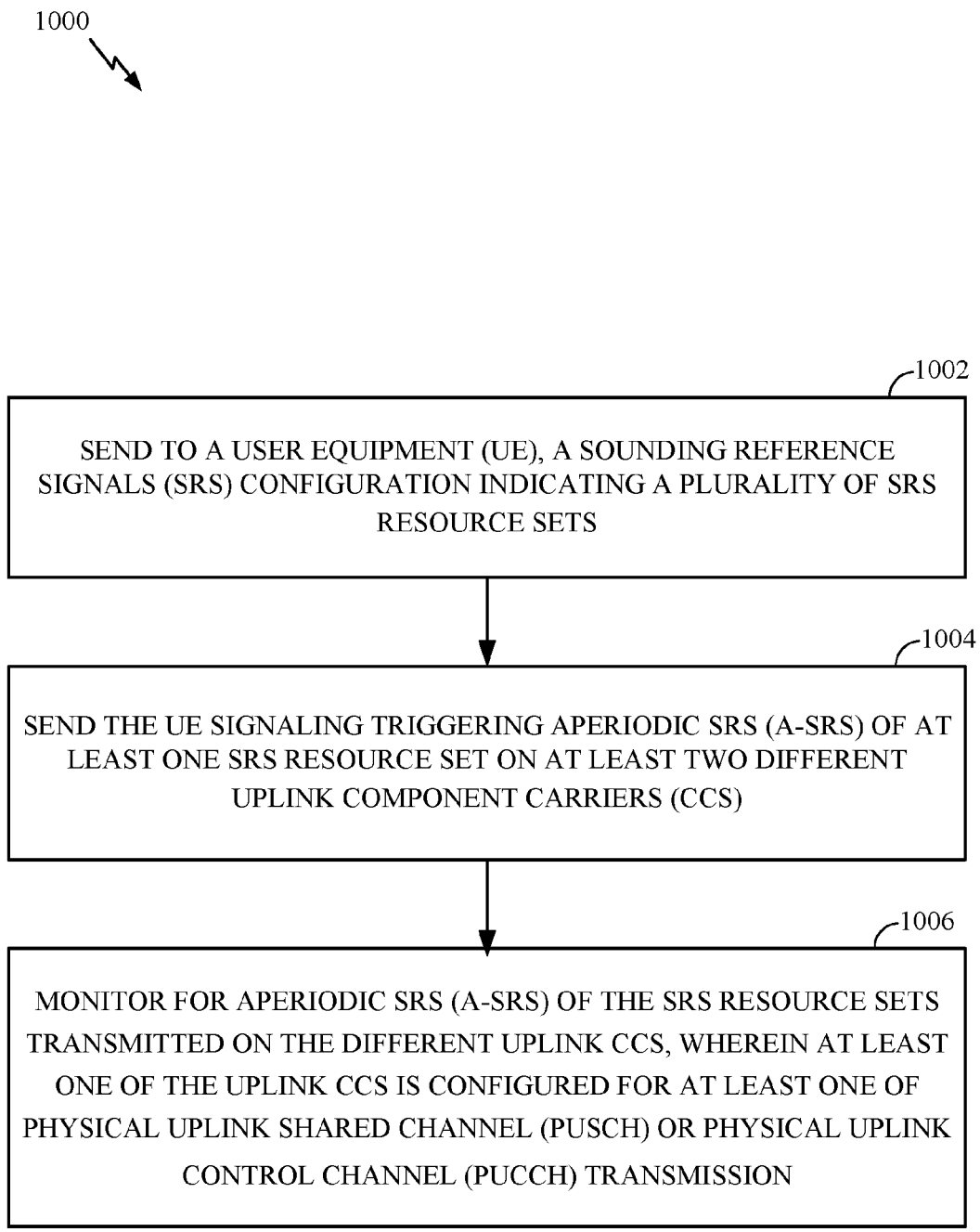
FIG. 10 illustrates example operations for wireless communications by a network entity, in accordance with certain aspects of the present disclosure.

FIG. 10 is a flow diagram illustrating example operations 1000 for wireless communication by a network entity and may be considered complementary to operations 900 of FIG. 9. For example, operations 1000 may be performed by a gNB to trigger A-SRS transmissions from a UE performing operations 900 of FIG. 9.

Operations 1000 begin, at 1002, by sending, to a user equipment (UE), a sounding reference signals (SRS) configuration indicating a plurality of SRS resource sets. At 1004, the network entity sends the UE signaling triggering aperiodic SRS (A-SRS) of at least one SRS resource set on at least two different uplink component carriers (CCs). For example, the signaling may be a certain format of DCI with certain bits repurposed to trigger A-SRS on a plurality of SRS resource sets.

At 1006, the network entity monitors for aperiodic SRS (A-SRS) of the SRS resource sets transmitted on the different uplink CCs. In this regard, at least one of the uplink CCs is configured for at least one of physical uplink shared channel (PUSCH) or physical uplink control channel (PUCCH) transmission.

FIG. 11 illustrates one example DCI format, format 0_1, with example bit fields that could be re-purposed to trigger A-SRS on a plurality of SRS resource sets. In general, any of the non-zero bit fields can be used except the ones used, except certain fields (e.g., HARQ, SRS request and TPC). Examples of such fields that may be repurposed, and the amount of bits available are:

Frequency domain resource assignment (FDRA): variable number of bits
MCS: 5 bits
New data indicator (NDI): 1 bit
Redundancy version (RV): 2 bit
Antenna ports: 2-5 bits In some cases, downlink assignment index (DAI) bits, HARQ process number, TCP command, and SRS resource indicator bits may also be used for SRS triggering.

As described herein, non-scheduling (dummy) DCI formats may be used for flexible SRS triggering. The DCI may indicate time domain parameters (such as available slot positions), frequency domain parameters (such as a group of CCs for SRS transmission), and power control parameters (such as a TPC for SRS).

In a similar way, DCI format 1_1 can be used for cross-CC A-SRS triggering, effectively sending as a dummy DCI that does not schedule DL data. In some cases, the UE may be provided an indication that the DL DCI format 1_1 does not schedule data and is used for xCC A-SRS triggering. For example, a specific code sequence may be used in the FDRA fields so that the UE understands this DCI does not schedule data. This FDRA code sequence can be RRC configured to the UE (e.g., '10101 . . .' or '01010 . . .'). This approach of using an 'FDRA' sequence can also be applied to DCI format 0_1 to differentiate between the two scenarios where xCC A-SRS is carried in the DCI or not when UL-SCH=0.

Figure 12A:
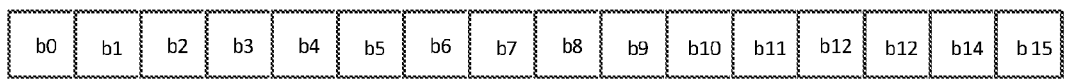
FIGS. 12A-12B illustrate example bit maps that may be used to trigger cross-carrier A-SRS, in accordance with certain aspects of the present disclosure.

In some cases, these re-purposed bits may be used as a bitmap to indicate cross component carrier (xCC) A-SRS triggering. For example, as illustrated in FIG. 12A, one option is to have bitmap with one bit per CC mapping. In this cases, a same SRS code point may be applied for all UL carriers, as indicated in the bitmap. For example, a bit value of "1" in bit i ($b_i$) may trigger A-SRS on a CC mapped to bit i ($CC_i$) with the SRS trigger code point in the SRS request field, while a bit value of "0" in bit i ($b_i$) indicates A-SRS is not triggered on $CC_i$.

Figure 12B:
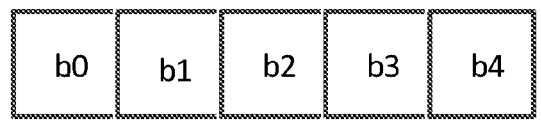

As illustrated in FIG. 12B, another option is to have a bitmap less than the number of CCs and use a mapping of bits to CC groups. The CC groupings can be configured via RRC signaling and can be based on frequency range (e.g., on FR1 vs FR2) and/or can be designed to group intra-band CCs together. In this cases, a bit value of "1" in bit i ($b_i$) may trigger A-SRS on an ith group of CCs mapped to bit i with the SRS trigger code point in the SRS request field, while a bit value of "0" in bit i ($b_i$) indicates A-SRS is not triggered on the ith group of CCs.

Figure 13:
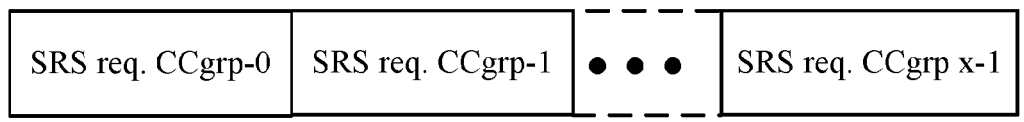
FIG. 13 illustrates an example of SRS request fields for triggering cross-carrier A-SRS, in accordance with certain aspects of the present disclosure.

Another option, illustrated in FIG. 13, is to have different SRS code points for different groups of CCs. As noted above, RRC signaling could be used for configuration of the CC grouping (e.g., X groups as shown in FIG. 13). The groups can have same # of CC or different number of CCs. Further, a CC can belong to different groups. For example, members of CC groups 0 and 1 (CC-g0 and CC-g1) could be:

CC-g0={CC1, CC2, CC3}, CC-g1={CC3,CC4}, etc.

For the example, in FIG. 13, assuming X groups, the DCI field may have 2X bits, effectively a 2-bit SRS request field for each of the X groups. If one CC has multiple A-SRS triggered (e.g., one CC in multiple groups), then the UE may use a priority rule to decide which SRS resource set to be transmitted.

Figure 14:
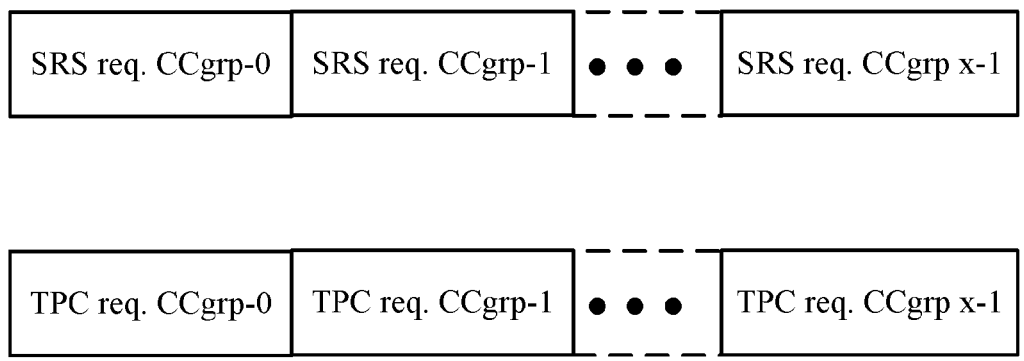
FIG. 14 is an arrangement of SRS request and TPC fields for triggering cross-carrier A-SRS, in accordance with certain aspects of the present disclosure.

In some cases, in addition to SRS request fields for each group, as shown in FIG. 12, additional fields may be signaled per group. For example, as shown in FIG. 14, the DCI may also include 2X transmit power control (TPC) bits (e.g., 2 TPC bits for each of the X groups). Again, in this case, the CC grouping (of the X groups) could be via RRC configuration, the groups can have same # of CC or different number of CCs, and one CC can belong to different group, such as:

CC-g0={CC1, CC2, CC3}, CC-g1={CC3,CC4}, CC-g2={CC6}.

As shown in FIG. 14, assuming 2-bits for each of the SRS request fields (SRS t) and TPC fields (TPC power command) per CC group.

Figure 15:
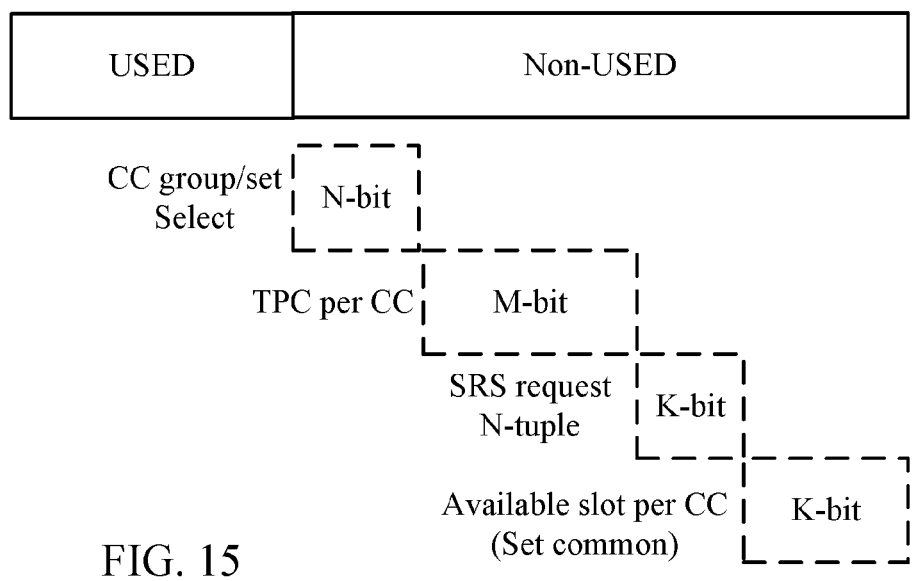
FIG. 15 illustrates example bit fields for SRS triggering, in accordance with certain aspects of the present disclosure.

FIG. 15 illustrates another option of a non-scheduling DCI format, with different sets of bits for CC group selection, a per CC TPC command, and a set of bits to indicate which SRS resources are triggered. As illustrated, N-bits may be for CC group (CC set) selection. For example, assuming N=2 bits, these bits may be set indicate different CC sets, such as: '01' may indicate $1^{st}$ CC set={CC0, CC1}, '10' may indicate a $2^{nd}$ CC set={CC2, CC3}, and '11' may indicate a $3^{rd}$ CC set={CC0, CC2}.

As illustrated, M-bits may be used to indicate a per-CC TPC command (e.g., M=2×#CCs per set). K-bits may be used to indicate which SRS resources are triggered. For example, according to one option, with K=2 (a same SRS request may be indicated for all CCs within set). According to another option, an SRS request may be different per each CC. For example, an SRS request may indicate a row index of RRC configured table of an n-tuple SRS request.

As illustrated, L-bits may be used to indicate a per-CC indication of available slots. For example, according to a first option, L may equal the #CCs per set x 1 or 2 bits. According to another option, L may equal 1, 2 bits for all CCs within set, such that (assuming 1 bit and considering component carrier 0 in triggered the CC group): '0' indicates SRS set #0 is be applied for slot t=0 and SRS set #1 is applied for slot t=0; and '1' indicates SRS set #0 is be applied for slot t=1 and SRS set #1 is applied for slot t=2.

TABLE 1

| | CC0 - available slot indication | |
|---|---|---|
| L bit value | SRS resource set #0 | SRS resource set #1 |
| 0 | t = 0 | t = 0 |
| 1 | t = 1 | t = 2 |

Figure 16:
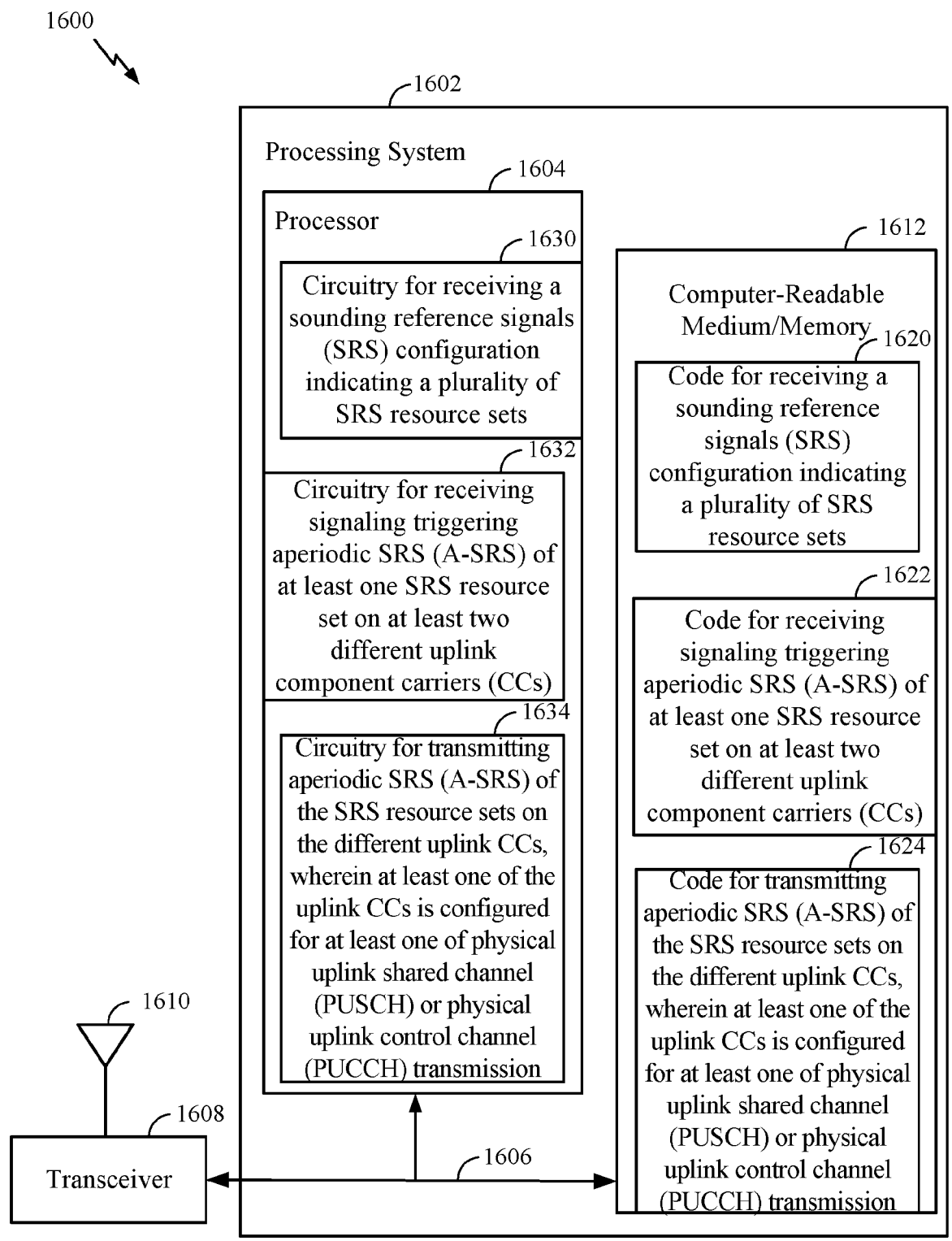
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 9. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable codes) that when executed by the processor 1604, cause the processor 1604 to perform the operations illustrated in FIG. 9, or other operations for performing the various techniques discussed herein. In certain aspects, computer-readable medium/memory 1612 stores code 1620 for receiving a sounding reference signals (SRS) configuration indicating a plurality of SRS resource sets; code 1622 for receiving signaling triggering aperiodic SRS (A-SRS) of at least one SRS resource set on at least two different uplink component carriers (CCs); and code 1624 for transmitting aperiodic SRS (A-SRS) of the SRS resource sets on the different uplink CCs, wherein at least one of the uplink CCs is configured for at least one of physical uplink shared channel (PUSCH) or physical uplink control channel (PUCCH) transmission. In certain aspects, the processor 1604 has circuitry configured to implement the code stored in the computer-readable medium/memory 1612. The processor 1604 includes circuitry 1630 for receiving a sounding reference signals (SRS) configuration indicating a plurality of SRS resource sets; circuitry 1632 for receiving signaling triggering aperiodic SRS (A-SRS) of at least one SRS resource set on at least two different uplink component carriers (CCs); and circuitry 1634 for transmitting aperiodic SRS (A-SRS) of the SRS resource sets on the different uplink CCs, wherein at least one of the uplink CCs is configured for at least one of physical uplink shared channel (PUSCH) or physical uplink control channel (PUCCH) transmission.

Figure 17:
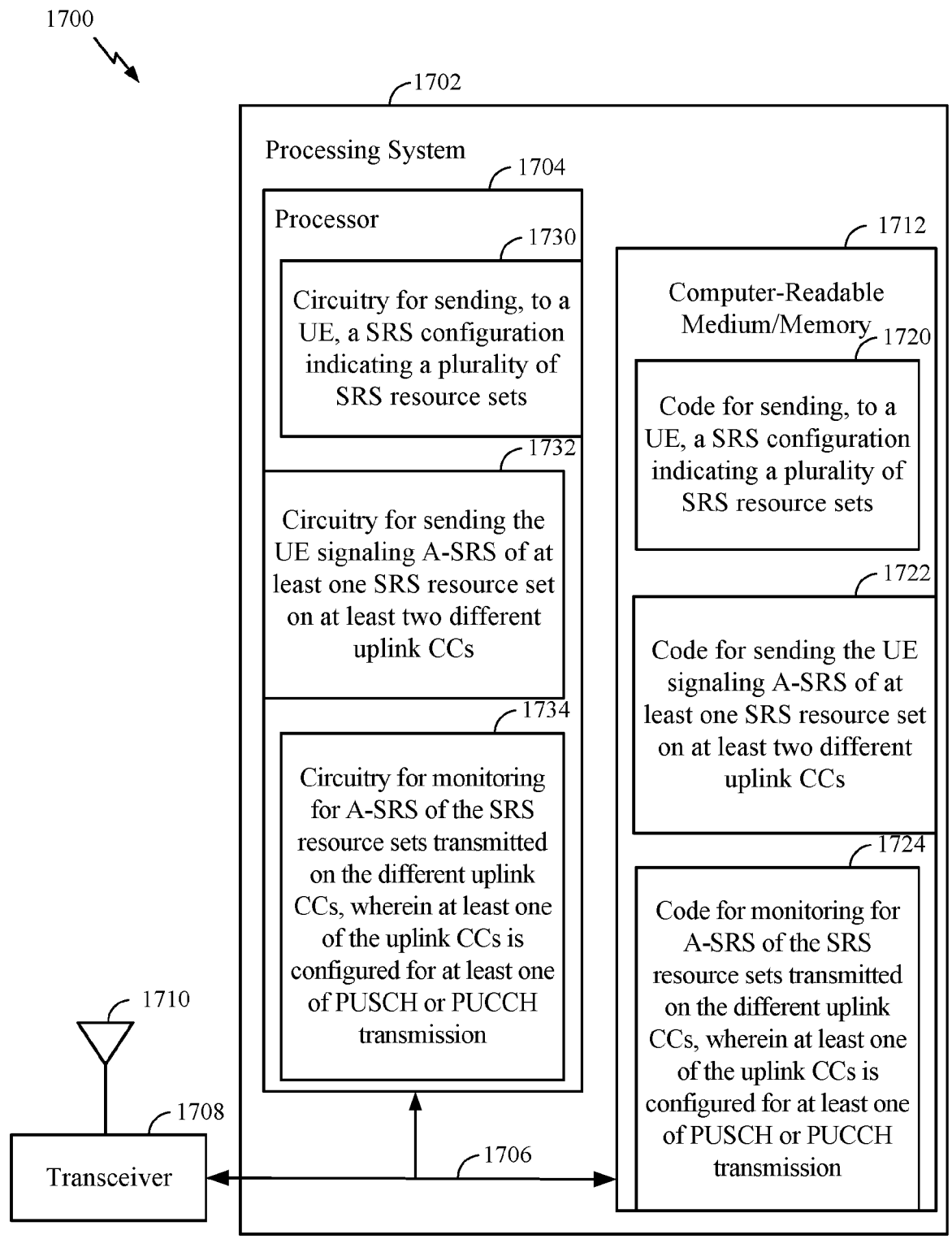
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 10. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable codes) that when executed by the processor 1704, cause the processor 1704 to perform the operations illustrated in FIG. 10, or other operations for performing the various techniques discussed herein. In certain aspects, computer-readable medium/memory 1712 stores code 1720 for sending, to a user equipment (UE), a sounding reference signals (SRS) configuration indicating a plurality of SRS resource sets; code 1722 for sending the UE signaling triggering aperiodic SRS (A-SRS) of at least one SRS resource set on at least two different uplink component carriers (CCs); and code 1724 for monitoring for aperiodic SRS (A-SRS) of the SRS resource sets transmitted on the different uplink CCs, wherein at least one of the uplink CCs is configured for at least one of physical uplink shared channel (PUSCH) or physical uplink control channel (PUCCH) transmission. In certain aspects, the processor 1704 has circuitry configured to implement the code stored in the computer-readable medium/memory 1712. The processor 1704 includes circuitry 1730 for sending, to a user equipment (UE), a sounding reference signals (SRS) configuration indicating a plurality of SRS resource sets; circuitry 1732 for sending the UE signaling triggering aperiodic SRS (A-SRS) of at least one SRS resource set on at least two different uplink component carriers (CCs); and circuitry 1734 for monitoring for aperiodic SRS (A-SRS) of the SRS resource sets transmitted on the different uplink CCs, wherein at least one of the uplink CCs is configured for at least one of physical uplink shared channel (PUSCH) or physical uplink control channel (PUCCH) transmission.

Example Aspects

In addition to the various aspects described above, aspects of specific combinations are within the scope of the disclosure, some of which are detailed below:

Aspect 1: A method for wireless communications by a user equipment, comprising: receiving a sounding reference signals (SRS) configuration indicating a plurality of SRS resource sets; receiving signaling triggering aperiodic SRS (A-SRS) of at least one SRS resource set on at least two different uplink component carriers (CCs); and transmitting A-SRS of the SRS resource sets on the different uplink CCs, wherein at least one of the uplink CCs is configured for at least one of physical uplink shared channel (PUSCH) or physical uplink control channel (PUCCH) transmission.

Aspect 2: The method of Aspect 1, wherein the signaling triggering the A-SRS comprises a downlink control information (DCI) reserved for triggering SRS.

Aspect 3: The method of Aspect 2, wherein the DCI is reserved for triggering SRS with transmit power control (TPC) commands or triggering SRS and channel state information reference signals (CSI-RS) for the specific UE.

Aspect 4: The method of any one of Aspects 1-3, wherein the signaling triggering the A-SRS comprises a downlink control information (DCI).

Aspect 5: The method of Aspect 4, wherein the DCI comprises group common DCI or UE-specific DCI.

Aspect 6: The method of Aspect 5, wherein the UE-specific DCI also schedules downlink or uplink data.

Aspect 7: The method of any one of Aspects 4-6, wherein the DCI is of a DCI format with one or more bit fields re-purposed to trigger A-SRS of SRS resource sets on at least two different uplink CCs.

Aspect 8: The method of Aspect 7, wherein the one or more re-purposed bit fields comprise at least one of: a frequency domain resource assignment (FDRA) field, time domain resource allocation (TDRA), a modulation and coding scheme (MCS) field, a new data indicator (NDI) field, a redundancy version (RV) field, or an antenna ports field.

Aspect 9: The method of Aspect 8, wherein the FDRA field is set to a specific value to indicate the DCI does not schedule data.

Aspect 10: The method of Aspect 9, wherein the specific value is configured via radio resource control (RRC) signaling.

Aspect 11: The method of any one of Aspects 4-10, wherein the DCI has an SRS request field indicating one or more SRS resource sets and which uplink CCs the SRS sets are triggered on.

Aspect 12: The method of Aspect 11, wherein the SRS request field indicates whether the SRS resource sets are triggered on an associated group of uplink CCs.

Aspect 13: The method of any one of Aspects 4-12, wherein: the DCI has multiple SRS request fields, each associated with a different group of one or more uplink CCs; and each SRS request field has an SRS code point indicating no A-SRS transmission or SRS resource sets for its associated group of uplink CCs.

Aspect 14: The method of Aspect 13, further comprising receiving radio resource control (RRC) signaling indicating the groups of CCs.

Aspect 15: The method of Aspect 13, wherein, if one CC belongs to multiple groups with SRS code points indicating different SRS resource sets, the UE uses a priority rule to decide which SRS resource set to be transmitted.

Aspect 16: The method of Aspect 14, wherein: the DCI also has multiple transmit power control (TPC) fields, each associated with one of the uplink CC groups; and each TPC field indicates a TPC value to apply when transmitting A-SRS on the associated group of uplink CCs.

Aspect 17: The method of any one of Aspects 1-16, wherein all of the uplink CCs are configured for PUSCH or PUCCH transmission.

Aspect 18: The method of any one of Aspects 1-17, wherein: each SRS resource set contains a plurality of SRS resources; and each of the SRS resources is associated with one or more parameters including at least one of: a time-domain position, a frequency-domain position, a cyclic shift, a comb offset, frequency hopping mode, or a sequence hopping mode.

Aspect 19: A method for wireless communications by a network entity, comprising: sending, to a user equipment (UE), a sounding reference signals (SRS) configuration indicating a plurality of SRS resource sets; sending the UE signaling triggering aperiodic SRS (A-SRS) of at least one SRS resource set on at least two different uplink component carriers (CCs); and monitoring for A-SRS of the SRS resource sets transmitted on the different uplink CCs, wherein at least one of the uplink CCs is configured for at least one of physical uplink shared channel (PUSCH) or physical uplink control channel (PUCCH) transmission.

Aspect 20: The method of Aspect 19, wherein the signaling triggering the A-SRS comprises a downlink control information (DCI) reserved for triggering SRS.

Aspect 21: The method of Aspect 20, wherein the DCI is reserved for triggering SRS with transmit power control (TPC) commands or triggering SRS and channel state information reference signals (CSI-RS) for the specific UE.

Aspect 22: The method of any one of Aspects 19-21, wherein the signaling triggering the A-SRS comprises a downlink control information (DCI).

Aspect 23: The method of Aspect 22, wherein the DCI comprises a group common DCI or UE-specific DCI.

Aspect 24: The method of any one of Aspects 22-23, wherein the DCI is of a DCI format with one or more bit fields re-purposed to trigger A-SRS of SRS resource sets on at least two different uplink CCs.

Aspect 25: The method of any one of Aspects 22-24, wherein the DCI has: an SRS request field indicating SRS resource sets and which uplink CCs the SRS sets are triggered on.

Aspect 26: The method of Aspect 25, wherein the SRS request field indicates whether the SRS resource sets are triggered on the associated group of uplink CCs.

Aspect 27: The method of any one of Aspects 19-26, wherein all of the uplink CCs are configured for PUSCH or PUCCH transmission.

Aspect 28: The method of any one of Aspects 19-27, wherein: each SRS resource set contains a plurality of SRS resources; and each of the SRS resources is associated with one or more parameters including at least one of: a time-domain position, a frequency-domain position, a cyclic shift, a comb offset, frequency hopping mode, or a sequence hopping mode.

Aspect 29: An apparatus for wireless communications by a user equipment, comprising: means for receiving a sounding reference signals (SRS) configuration indicating a plurality of SRS resource sets; means for receiving signaling triggering aperiodic SRS (A-SRS) of at least one SRS resource set on at least two different uplink component carriers (CCs); and means for transmitting A-SRS of the SRS resource sets on the different uplink CCs, wherein at least one of the uplink CCs is configured for at least one of physical uplink shared channel (PUSCH) or physical uplink control channel (PUCCH) transmission.

Aspect 30: An apparatus for wireless communications by a network entity, comprising: means for sending, to a user equipment (UE), a sounding reference signals (SRS) configuration indicating a plurality of SRS resource sets; means for sending the UE signaling triggering aperiodic SRS (A-SRS) of at least one SRS resource set on at least two different uplink component carriers (CCs); and means for monitoring for A-SRS of the SRS resource sets transmitted on the different uplink CCs, wherein at least one of the uplink CCs is configured for at least one of physical uplink shared channel (PUSCH) or physical uplink control channel (PUCCH) transmission.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, the various processor shown in FIG. 3 may be configured to perform operations 1600 and 1700 of FIGS. 16 and 17.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIGS. 16 and 17).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment, comprising:
   receiving a sounding reference signals (SRS) configuration indicating a plurality of SRS resource sets;
   receiving signaling triggering aperiodic SRS (A-SRS) of at least one SRS resource set on at least two different uplink component carriers (CCs) wherein the signaling triggering the A-SRS comprises a downlink control information (DCI) and wherein the DCI is of a DCI format with one or more bit fields re-purposed to trigger A-SRS of SRS resource sets on at least two different uplink CCs; and
   transmitting A-SRS of the SRS resource sets on the different uplink CCs, wherein at least one of the uplink CCs is configured for at least one of physical uplink shared channel (PUSCH) or physical uplink control channel (PUCCH) transmission.

2. The method of claim 1, wherein the signaling triggering the A-SRS comprises a downlink control information (DCI) reserved for triggering SRS.

3. The method of claim 2, wherein the DCI is reserved for triggering SRS with transmit power control (TPC) commands or triggering SRS and channel state information reference signals (CSI-RS) for the specific UE.

4. The method of claim 1, wherein the DCI comprises group common DCI or UE-specific DCI.

5. The method of claim 4, wherein the UE-specific DCI also schedules downlink or uplink data.

6. The method of claim 1, wherein the one or more re-purposed bit fields comprise at least one of: a frequency domain resource assignment (FDRA) field, time domain resource allocation (TDRA), a modulation and coding scheme (MCS) field, a new data indicator (NDI) field, a redundancy version (RV) field, or an antenna ports field.

7. The method of claim 6, wherein the FDRA field is set to a specific value to indicate the DCI does not schedule data.

8. The method of claim 7, wherein the specific value is configured via radio resource control (RRC) signaling.

9. The method of claim 1, wherein the DCI has:
   an SRS request field indicating one or more SRS resource sets and which uplink CCs the SRS sets are triggered on.

10. The method of claim 9, wherein the SRS request field indicates whether the SRS resource sets are triggered on an associated group of uplink CCs.

11. The method of claim 1, wherein:
    the DCI has multiple SRS request fields, each associated with a different group of one or more uplink CCs; and
    each SRS request field has an SRS code point indicating no A-SRS transmission or SRS resource sets for its associated group of uplink CCs.

12. The method of claim 11, further comprising receiving radio resource control (RRC) signaling indicating the groups of CCs.

13. The method of claim 12, wherein:
    the DCI also has multiple transmit power control (TPC) fields, each associated with one of the uplink CC groups; and
    each TPC field indicates a TPC value to apply when transmitting A-SRS on the associated group of uplink CCs.

14. The method of claim 11, wherein, if one CC belongs to multiple groups with SRS code points indicating different SRS resource sets, the UE uses a priority rule to decide which SRS resource set to be transmitted.

15. The method of claim 1, wherein all of the uplink CCs are configured for PUSCH or PUCCH transmission.

16. The method of claim 1, wherein:
    each SRS resource set contains a plurality of SRS resources; and
    each of the SRS resources is associated with one or more parameters including at least one of: a time-domain position, a frequency-domain position, a cyclic shift, a comb offset, frequency hopping mode, or a sequence hopping mode.

17. A method for wireless communications by a network entity, comprising:
    sending, to a user equipment (UE), a sounding reference signals (SRS) configuration indicating a plurality of SRS resource sets;
    sending the UE signaling triggering aperiodic SRS (A-SRS) of at least one SRS resource set on at least two different uplink component carriers (CCs) wherein the signaling triggering the A-SRS comprises a downlink control information (DCI) and wherein the DCI is of a DCI format with one or more bit fields re-purposed to trigger A-SRS of SRS resource sets on at least two different uplink CCs; and monitoring for A-SRS of the SRS resource sets transmitted on the different uplink CCs, wherein at least one of the uplink CCs is configured for at least one of physical uplink shared channel (PUSCH) or physical uplink control channel (PUCCH) transmission.

18. The method of claim 17, wherein the signaling triggering the A-SRS comprises a downlink control information (DCI) reserved for triggering SRS.

19. The method of claim 18, wherein the DCI is reserved for triggering SRS with transmit power control (TPC) commands or triggering SRS and channel state information reference signals (CSI-RS) for the specific UE.

20. The method of claim 17, wherein the DCI comprises a group common DCI or UE-specific DCI.

21. The method of claim 17, wherein the DCI has:
an SRS request field indicating SRS resource sets and which uplink CCs the SRS sets are triggered on.

22. The method of claim 21, wherein the SRS request field indicates whether the SRS resource sets are triggered on the associated group of uplink CCs.

23. The method of claim 17, wherein all of the uplink CCs are configured for PUSCH or PUCCH transmission.

24. The method of claim 17, wherein:
each SRS resource set contains a plurality of SRS resources; and
each of the SRS resources is associated with one or more parameters including at least one of: a time-domain position, a frequency-domain position, a cyclic shift, a comb offset, frequency hopping mode, or a sequence hopping mode.

25. An apparatus for wireless communications by a user equipment, comprising:

means for receiving a sounding reference signals (SRS) configuration indicating a plurality of SRS resource sets;

means for receiving signaling triggering aperiodic SRS (A-SRS) of at least one SRS resource set on at least two different uplink component carriers (CCs) wherein the signaling triggering the A-SRS comprises a downlink control information (DCI) and wherein the DCI is of a DCI format with one or more bit fields re-purposed to trigger A-SRS of SRS resource sets on at least two different uplink CCs; and means for transmitting A-SRS of the SRS resource sets on the different uplink CCs, wherein at least one of the uplink CCs is configured for at least one of physical uplink shared channel (PUSCH) or physical uplink control channel (PUCCH) transmission.

26. An apparatus for wireless communications by a network entity, comprising:

means for sending, to a user equipment (UE), a sounding reference signals (SRS) configuration indicating a plurality of SRS resource sets;

means for sending the UE signaling triggering aperiodic SRS (A-SRS) of at least one SRS resource set on at least two different uplink component carriers (CCs) wherein the signaling triggering the A-SRS comprises a downlink control information (DCI) and wherein the DCI is of a DCI format with one or more bit fields re-purposed to trigger A-SRS of SRS resource sets on at least two different uplink CCs; and means for monitoring for A-SRS of the SRS resource sets transmitted on the different uplink CCs, wherein at least one of the uplink CCs is configured for at least one of physical uplink shared channel (PUSCH) or physical uplink control channel (PUCCH) transmission.

* * * * *